United States Patent Office 3,288,832
Patented Nov. 29, 1966

3,288,832
THIOLCARBAMATE ESTERS AND METHOD OF PREPARATION
Paul J. Stoffel, St. Louis, Mo., assignor to Monsanto Company, a corporation of Delaware
No Drawing. Filed Sept. 23, 1963, Ser. No. 310,856
18 Claims. (Cl. 260—455)

This invention relates to a novel chemical method and to new thiolcarbamate esters prepared thereby. The new compounds are biological toxicants useful in the control of propulations of microorganisms, such as fungus, insects and bacteria.

The new chemical procedure and products in accordance with this invention may be defined structurally by the equation:

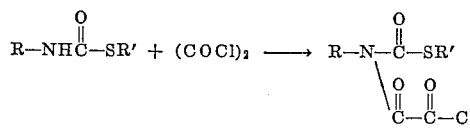

wherein R and R' are each selected from the group consisting of hydrogen; hydrocarbon radicals selected from the class consisting of alkyl having up to 12 carbon atoms, alkenyl having up to 12 carbon atoms, cycloalkyl having 4 to 8 carbon atoms, phenyl and benzyl; and the said hydrocarbon radicals having up to four substituents selected from the class consisting of chlorine, bromine, nitro, alkyl having up to four carbon atoms, alkoxy having up to four carbon atoms and phenyl.

The novel procedure by which the new compounds are prepared involves contacting oxalyl chloride with esters of thiolcarbamic acids of the above defined configuration. Both the N-substituents and the ester group may vary widely as above described. Although the reaction may be conducted by physical contact of the reactants, preferred practice involves the dissolution of one or both of the substituents and conducting the reaction in the solvent medium. Any mutual solvent for the reactants which is inherent under the conditions of the reaction may be used, for example benzene, toluene, xylene, chlorotoluene, 1,4-dichlorobenzene, bromobenzene and other aromatic and halogen substituted aromatic hydrocarbons. It is generally desirable that the solvent be such as to reflux within the preferred temperature range. The reaction may be conducted at temperatures as low as 30° C. but higher temperatures will produce preferred rates of reaction. Temperatures as high as 180° C. may be useful; however, decomposition of the product takes place if this temperature is exceeded.

When the reaction has been completed or has proceeded to a desired extent a product may be separated from a solvent medium by the addition of a suitable non-solvent for the product which is miscible with the solvent medium. This will reduce the solubility of the product in the solvent medium and cause a precipitation of the desired product. A reduction in temperature will also aid in the separation of the desired product. A suitable non-solvent is n-hexane or any other aliphatic petroleum fraction. The solid product prepared by filtering may be purified by recrystallization in any suitable solvent, for example acetone.

Although the reaction of oxalyl chloride with alkyl thionocarbanilates produces thiazolidinedione-2-thione the reaction with the isomeric alkyl thiolcarbamates will not produce the same cyclic compounds, even by excessive heating up to the decomposition point.

Further details of the preparation and properties of the new compounds are set forth in the following examples.

EXAMPLE 1

By heating at the benzene reflux temperature a dissolved mixture of oxalyl chloride and methyl 3,4-dichlorothiolcarbanilate a product (M.P. 36–37° C.) of the following structure is obtained:

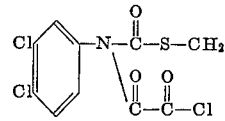

EXAMPLE 2

The procedure of Example 1 using ethyl 3,4-dichlorothiolcarbanilate in place of the methyl ester produced a product (M.P. 35–36° C.) of the structure:

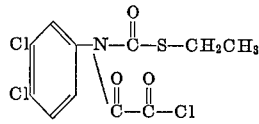

EXAMPLE 3

The isopropyl ester corresponding to the products of the two preceding examples was prepared by reacting oxalyl chloride with isopropyl 3,4-dichlorothiolcarbanilate. The product (M.P. 32–33° C.) was found to have the structure:

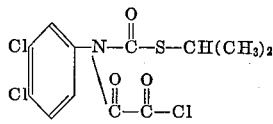

EXAMPLE 4

By heating equimolar proportions of oxalyl chloride and ethyl thiolcarbanilate at the reflux temperature of the toluene reaction mixture, a product was isolated from the reaction mixture and found to have the structure:

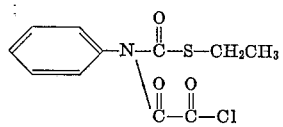

EXAMPLE 5

The reaction product of oxalyl chloride and benzyl thiolcarbamate at reflux temperature in xylene solution was found to have the structure:

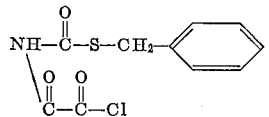

EXAMPLE 6

A benzene solution of oxalyl chloride and allyl N-allylthiolcarbamate was heated at 80° C. for five hours. The reaction mixture was evacuated on a steam bath to remove the benzene. The recovered product was found to have the structure:

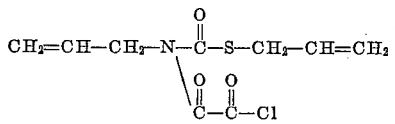

EXAMPLE 7

The procedure of Example 1 was used to react benzyl N-isopropylthiolcarbamate with oxalyl chloride. A compound of the following structure was separated from the reaction mixture:

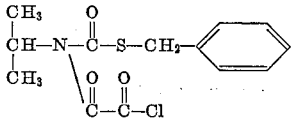

EXAMPLE 8

A mixture of equal mols of oxalyl chloride and methoxyphenyl N-n-butylthiolcarbamate was dissolved in toluene and heated to the reflux temperature for five hours. The product precipitated by the addition of n-hexane was found to have the structure:

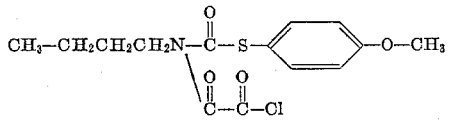

EXAMPLE 9

Using the procedure of Example 1, oxalyl chloride and methyl N-cyclohexylthiolcarbamate were reacted to obtain a product of the structure:

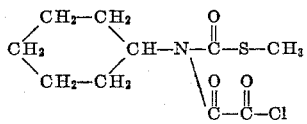

EXAMPLE 10

The product obtained by reacting oxalyl chloride and methyl 4-nitrothiolcarbanilate by the procedure of Example 8 produced a compound of the structure:

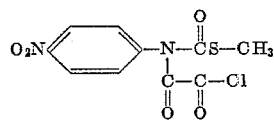

Although the invention is described with respect to specific modifications, it is not intended that the details thereof are limitations on the scope of the invention except to the extent incorporated in the following claims.

Addendum

Additional compounds within the scope of the invention are those prepared by reacting oxalyl chloride with the following esters of thiocarbamic acid:

cycloheptyl N-nitrobenzylthiolcarbamate
n-(3-nitro)butyl N-ethoxypropylthiolcarbamate
4-methylphenyl N-(4-bromophenyl)thiolcarbamate
4-methylbenzyl N-(2,4-dimethylphenyl)thiolcarbamate

What is claimed is:

1. A compound of the structure:

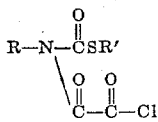

wherein R and R' are each selected from the class consisting of hydrogen; hydrocarbon radicals selected from the class consisting of alkyl having up to 12 carbon atoms, alkenyl having up to 12 carbon atoms, cycloalkyl having four to eight carbon atoms, phenyl and benzyl; and the said hydrocarbon radicals having up to four substituents selected from the class consisting of chlorine, nitro, bromine, alkyl having up to four carbon atoms, alkoxy having up to four carbon atoms and phenyl.

2. A method of preparing compounds of the structure:

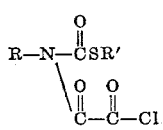

wherein R and R' are each selected from the class consisting of hydrogen; hydrocarbon radicals selected from the class consisting of alkyl having up to 12 carbon atoms, alkenyl having up to 12 carbon atoms, cycloalkyl having 4 to 8 carbon atoms, phenyl and benzyl; and the said hydrocarbon radicals having up to four substituents selected from the class consisting of chlorine, nitro, bromine, alkyl having up to four carbon atoms, alkoxy having up to four carbon atoms and phenyl; which comprises contacting oxalyl chloride and the carbamic acid ester of the structure: RNHCOSR' at reflux temperature in an aromatic solvent.

3. A compound of the structure:

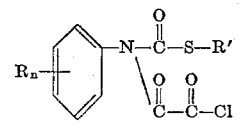

wherein R is a halogen of the class consisting of chlorine and bromine; wherein $n$ is an integer from 1 to 4; and wherein R' is an alkyl radical having up to 12 carbon atoms.

4. The method of preparing a compound of the structure:

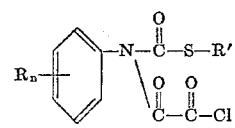

wherein R is a halogen of the class consisting of chlorine and bromine; wherein $n$ is an integer from 1 to 4; and wherein R' is an alkyl radical having up to 12 carbon atoms; which comprises heating oxalyl chloride and the compound of the structure:

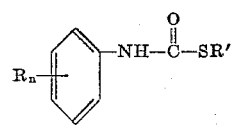

at reflux temperature in an aromatic solvent.

5. A compound of the structure:

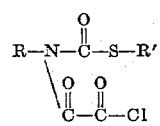

wherein R and R' are each alkyl radicals having up to 12 carbon atoms.

6. The method of preparing a compound of the structure:

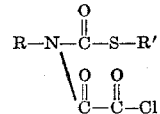

wherein R and R' are each alkyl radicals having up to 12 carbon atoms; which comprises reacting oxalyl chloride and a compound of the structure: RNHCOSR' at reflux temperature in an aromatic solvent.

7. A compound of the structure:

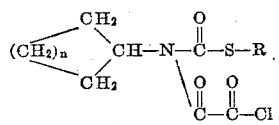

wherein $n$ is an integer from 1 to 5 and R is an alkyl radical having up to 12 carbon atoms.

8. The method of preparing a compound of the structure:

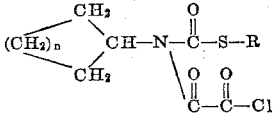

wherein $n$ is an integer from 1 to 5 and R is an alkyl radical having up to 12 carbon atoms; which comprises heating oxalyl chloride and a compound of the structure:

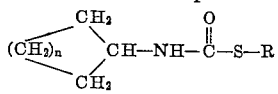

in an inert solvent medium at reflux temperature.

9. A compound of the structure:

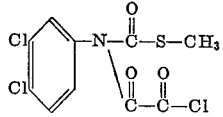

10. The method of preparing a compound of the structure:

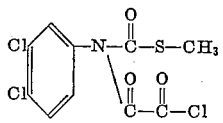

which comprises heating oxalyl chloride and methyl 3,4-dichlorothiolcarbanilate in an aromatic hydrocarbon medium at a temperature of 30 to 180° C.

11. A compound of the structure:

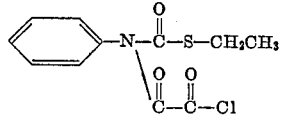

12. The method of preparing a compound of the structure:

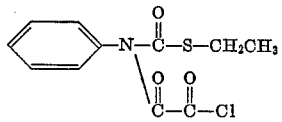

which comprises heating oxalyl chloride and ethyl thiolcarbanilate at a temperature between 30 and 180° C. in an aromatic hydrocarbon medium.

13. A compound of the structure:

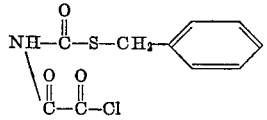

14. The method of preparing a compound of the structure:

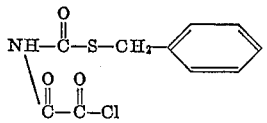

which comprises heating oxalyl chloride and benzyl thiolcarbamate at a temperature between 30 and 180° C. in an aromatic hydrocarbon medium.

15. A compound of the structure:

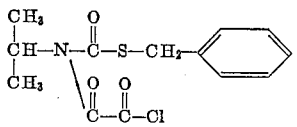

16. The method of preparing a compound of the structure:

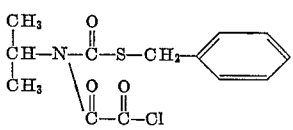

which comprises heating oxalyl chloride and benzyl N-isopropylthiolcarbamate at a temperature between 30 and 180° C. in an aromatic hydrocarbon medium.

17. A compound of the structure:

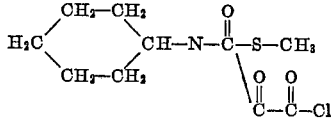

18. The method of preparing a compound of the structure:

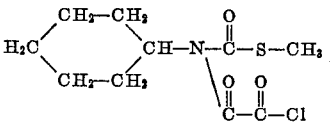

which comprises reacting oxalyl chloride and methyl N-cyclohexylthiolcarbamate at reflux temperature in an aromatic solvent.

References Cited by the Examiner

Barnwater, Recueil Travaux Chimiques des Pays-Bas, 1912, tome 31, pp. 105–141 (p. 109 relied on).

CHARLES B. PARKER, *Primary Examiner.*

DALE R. MAHANAND, *Assistant Examiner.*